(12) United States Patent
O'Brien et al.

(10) Patent No.: US 10,741,322 B2
(45) Date of Patent: Aug. 11, 2020

(54) DECORATIVE MULTI-LAYER SURFACING MATERIALS HAVING EMBEDDED CONDUCTIVE MATERIALS, SOLID SURFACES MADE THEREWITH, METHODS FOR MAKING SUCH SURFACING MATERIALS AND USES THEREFOR

(71) Applicant: The Diller Corporation, Cincinnati, OH (US)

(72) Inventors: Kevin O'Brien, Cincinnati, OH (US); Bryce Cole, Mason, OH (US); Robert Jacob Kramer, Franklin, OH (US)

(73) Assignee: THE DILLER CORPORATION, Cincinnati, OH (US)

( * ) Notice: Subject to any disclaimer, the term of this patent is extended or adjusted under 35 U.S.C. 154(b) by 0 days.

(21) Appl. No.: 16/157,568

(22) Filed: Oct. 11, 2018

(65) Prior Publication Data

US 2019/0198224 A1 Jun. 27, 2019

Related U.S. Application Data

(63) Continuation of application No. 15/850,050, filed on Dec. 21, 2017, now abandoned, which is a
(Continued)

(51) Int. Cl.
*H01F 27/28* (2006.01)
*H01F 38/14* (2006.01)
(Continued)

(52) U.S. Cl.
CPC ........... *H01F 27/2804* (2013.01); *B32B 3/08* (2013.01); *B32B 3/266* (2013.01); *B32B 7/04* (2013.01);
(Continued)

(58) Field of Classification Search
CPC ............................ H01F 38/14; H01F 27/2804
(Continued)

(56) References Cited

U.S. PATENT DOCUMENTS

| 6,180,215 B1 * | 1/2001 | Sprietsma | ............... B32B 27/04 |
| | | | 428/209 |
| 6,794,769 B2 * | 9/2004 | Black | .................... H01F 27/266 |
| | | | 307/104 |

(Continued)

FOREIGN PATENT DOCUMENTS

WO WO-9938686 A1 * 8/1999 ............. B32B 27/04

*Primary Examiner* — Alfonso Perez Borroto
(74) *Attorney, Agent, or Firm* — Ice Miller LLP

(57) ABSTRACT

Decorative, multi-layer surfacing materials, surfaces made therewith, methods of making such and wireless power transmission using the same, which surfacing materials comprise: a first resin-impregnated paper layer and a second resin-impregnated paper layer, and a first conductive material having a first terminus and a second terminus and capable of carrying an electric current from the first terminus to the second terminus; wherein the first conductive material is disposed on a first surface of the first resin-impregnated paper layer; wherein the first resin-impregnated paper layer and the second resin-impregnated paper layer are disposed in a stacked and compressed such that the first conductive material is encapsulated between the first resin-impregnated paper layer and the second resin-impregnated paper layer; and wherein at least one of the first resin-impregnated paper layer, the second resin-impregnated paper layer or an optional additional resin-impregnated paper layer is a decorative layer.

30 Claims, 4 Drawing Sheets

Related U.S. Application Data continuation of application No. 14/881,698, filed on Oct. 13, 2015.

(60) Provisional application No. 62/062,615, filed on Oct. 10, 2014.

(51) Int. Cl.
| | |
|---|---|
| *B32B 29/00* | (2006.01) |
| *H01F 5/00* | (2006.01) |
| *B32B 3/08* | (2006.01) |
| *B32B 27/40* | (2006.01) |
| *B32B 27/42* | (2006.01) |
| *B32B 27/36* | (2006.01) |
| *B32B 27/30* | (2006.01) |
| *B32B 3/26* | (2006.01) |
| *B32B 7/04* | (2019.01) |
| *B32B 27/10* | (2006.01) |
| *H01F 27/24* | (2006.01) |
| *H01F 41/04* | (2006.01) |
| *H02J 5/00* | (2016.01) |
| *H02J 7/00* | (2006.01) |
| *H02J 7/02* | (2016.01) |

(52) U.S. Cl.
CPC ............ *B32B 27/10* (2013.01); *B32B 27/30* (2013.01); *B32B 27/308* (2013.01); *B32B 27/36* (2013.01); *B32B 27/40* (2013.01); *B32B 27/42* (2013.01); *B32B 29/00* (2013.01); *B32B 29/005* (2013.01); *H01F 5/003* (2013.01); *H01F 27/24* (2013.01); *H01F 38/14* (2013.01); *H01F 41/041* (2013.01); *H02J 5/005* (2013.01); *B32B 2250/03* (2013.01); *B32B 2255/12* (2013.01); *B32B 2255/205* (2013.01); *B32B 2255/26* (2013.01); *B32B 2255/28* (2013.01); *B32B 2260/028* (2013.01); *B32B 2260/046* (2013.01); *B32B 2307/20* (2013.01); *B32B 2307/202* (2013.01); *B32B 2307/402* (2013.01); *B32B 2307/584* (2013.01); *B32B 2451/00* (2013.01); *B32B 2457/00* (2013.01); *H01F 2027/2809* (2013.01); *H02J 7/0042* (2013.01); *H02J 7/025* (2013.01)

(58) Field of Classification Search
USPC ........................................................ 307/104
See application file for complete search history.

(56) References Cited

U.S. PATENT DOCUMENTS

| | | | | |
|---|---|---|---|---|
| D765,597 | S * | 9/2016 | Kim | D13/108 |
| 9,537,523 | B2 * | 1/2017 | Chen | H04B 1/3883 |
| 9,831,713 | B2 * | 11/2017 | Kato | H02J 7/0042 |
| 2009/0290332 | A1 * | 11/2009 | Jacobs | H05B 45/37 |
| | | | | 362/183 |
| 2010/0219791 | A1 * | 9/2010 | Cheng | H01F 3/02 |
| | | | | 320/108 |
| 2013/0069444 | A1 * | 3/2013 | Waffenschmidt | H01F 38/14 |
| | | | | 307/104 |
| 2014/0265612 | A1 * | 9/2014 | Choi | H01F 27/2804 |
| | | | | 307/104 |
| 2014/0306653 | A1 * | 10/2014 | Hirobe | H01F 27/367 |
| | | | | 320/108 |
| 2015/0076919 | A1 * | 3/2015 | Park | H02J 5/005 |
| | | | | 307/104 |
| 2015/0194258 | A1 * | 7/2015 | Scholz | H01F 17/0013 |
| | | | | 307/104 |
| 2015/0302983 | A1 * | 10/2015 | Park | H01F 27/2823 |
| | | | | 320/108 |
| 2015/0303708 | A1 * | 10/2015 | Efe | H01F 38/14 |
| | | | | 307/104 |
| 2015/0349578 | A1 * | 12/2015 | Hu | H01F 41/041 |
| | | | | 320/108 |
| 2016/0012968 | A1 * | 1/2016 | Chiu | H01F 38/14 |
| | | | | 320/108 |
| 2016/0013667 | A1 * | 1/2016 | Hosotani | H01F 27/2804 |
| | | | | 307/104 |
| 2016/0094082 | A1 * | 3/2016 | Ookawa | H01F 38/14 |
| | | | | 320/108 |

* cited by examiner

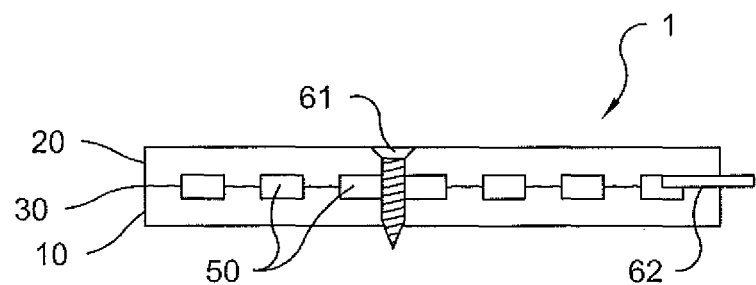
Fig. 1b
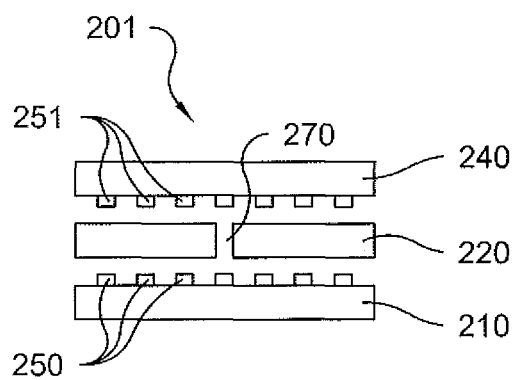
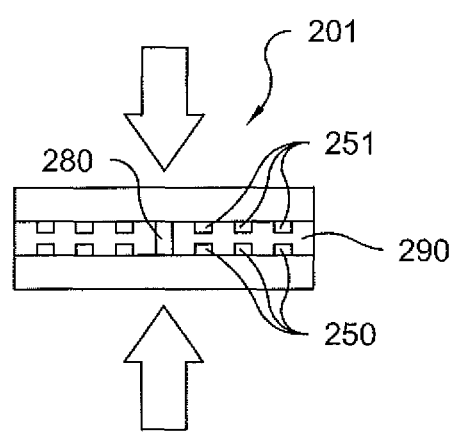
Fig. 2a          Fig. 2b

DECORATIVE MULTI-LAYER SURFACING MATERIALS HAVING EMBEDDED CONDUCTIVE MATERIALS, SOLID SURFACES MADE THEREWITH, METHODS FOR MAKING SUCH SURFACING MATERIALS AND USES THEREFOR

CROSS-REFERENCE TO RELATED APPLICATIONS

This application is a continuation application of U.S. Nonprovisional application Ser. No. 15/850,050, filed Dec. 21, 2017, which is a continuation of U.S. Nonprovisional application Ser. No. 14/881,698, filed Oct. 13, 2015 (now U.S. Pat. No. 9,881,727), which claims the benefit of U.S. Provisional Application No. 62/062,615, filed Oct. 10, 2014.

BACKGROUND OF THE INVENTION

Decorative laminates have been used as surfacing materials for many years, in both commercial and residential applications, where pleasing aesthetic effects in conjunction with desired functional behavior (such as superior wear, heat and stain resistance, cleanability and cost) are preferred. Typical applications have historically included furniture, kitchen countertops, table tops, store fixtures, bathroom vanity tops, cabinets, wall paneling, office partitions, and the like.

Over the last several years, society has seen the proliferation of portable, rechargeable electronic devices in office and home environments. Mobile electronic devices such as cellular phones, laptop computer, tablets, and the like are commonplace in homes and offices. Such portable devices generally employ rechargeable batteries as their power source to maintain mobility. In homes and offices with multiple residents, the total number of rechargeable devices often out-numbers people. Typically, each battery powered device requires its own charger and power source, which is usually an alternating current (AC) power outlet. An unintended consequence of the proliferation of electronic devices is the proliferation of power converters, power sources, plugs and cables which clutter the office and home environments. Moreover, the practical implication of device-specific chargers is the inevitable situation of misplaced or forgotten chargers.

Approaches are being developed that use over-the-air or wireless power transmission between a transmitter and a receiver coupled to the electronic device to be charged. Such approaches generally fall into two categories. One is based on the coupling of plane wave radiation (also called far-field radiation) between a transmit antenna and a receive antenna on the device to be charged. Other approaches to wireless energy transmission are based on inductive coupling between a transmit antenna embedded, for example, in a "charging mat" or portable surface and a receive antenna (and a rectifying circuit) embedded in the host electronic device to be charged. Various mobile telephones are marketed with such wireless power receiving capability. Though this approach can have the capability to simultaneously charge multiple devices in the same area, this area, such as a charging pad or mat which itself is plugged into an AC wall outlet, is typically small and requires the user to accurately locate the devices in a specific area.

Therefore, it would be desirable to provide surfacing that is expansive, functional, and capable of serving as a platform for providing wireless energy transfer via inductive coupling to numerous devices.

BRIEF SUMMARY OF THE INVENTION

The present invention is directed, in general, to decorative, multi-layer surfacing materials having electric functionality. More specifically, the present invention is directed to decorative, multi-layer surfacing materials, preferably high pressure laminates, which contain embedded conductive pathways and optional, additional circuit components, as well as methods for preparing such materials, solid surfaces capped with such materials, and methods of wirelessly transmitting energy from such materials to a device configured to receive wireless energy transmission. Various embodiments of the present invention can thus provide decorative, durable, functional, surfacing materials capable of accomplishing wireless power transfer to numerous devices at the same time. Surfacing materials in accordance with various embodiments of the present invention can be used to provide entire countertops, tables, desks and other ordinary furniture items found throughout homes and offices with the capability to wirelessly transfer power to rechargeable devices configured to receive wireless power transmission via coupling, which may be inductive and/or resonance coupling.

One embodiment of the present invention includes a decorative, multi-layer surfacing material comprising: a first resin-impregnated paper layer and a second resin-impregnated paper layer, and a first conductive material having a first terminus and a second terminus and capable of carrying an electric current from the first terminus to the second terminus; wherein the first conductive material is disposed on a first surface of the first resin-impregnated paper layer; wherein the first resin-impregnated paper layer and the second resin-impregnated paper layer are disposed in a stacked and compressed relationship such that the first conductive material is encapsulated between the first resin-impregnated paper layer and the second resin-impregnated paper layer; and wherein at least one of the first resin-impregnated paper layer, the second resin-impregnated paper layer or an optional additional resin-impregnated paper layer is a decorative layer. In any of the various embodiments of the present invention, the resin can be a thermoset resin such that the paper layers in a stacked relationship can be compressed and heated to cure the thermoset resin. As used herein, cured can refer to both curing of a thermoset resin in the sense of its irreversible setting, or the crosslinking of other polymers with a separate cross-linker or by various forms of energy, or any means of fixing the resin in its compressed form such that the conductive materials are encapsulated and will remain so during the normal operating temperature range of the surface application.

Another embodiment of the present invention includes a method comprising: (a) providing at least two sheets of resin-impregnated paper; (b) disposing a patterned conductive material on a surface of one of the at least two sheets of resin-impregnated paper; and (c) compressing the at least two sheets of resin-impregnated paper together with heat and pressure in a facing relationship wherein the conductive material is disposed between the at least two sheets of resin-impregnated paper.

Another embodiment of the present invention includes a method of wirelessly transmitting energy, the method comprising: (i) providing a decorative, multi-layer surfacing material according to an embodiment of the present invention; (ii) providing electrical current to the first conductive material such that an electromagnetic field is generated in a region above and adjacent to an upper surface of the surfacing material; and (iii) placing a device configured to receive wireless energy transmission proximate to the upper surface and within the electromagnetic field.

Yet another embodiment of the present invention includes a solid surface comprising a decorative, multi-layer surfacing material according to an embodiment of the present invention disposed on a supporting substrate, such as, for example, fiberboard.

In various preferred embodiments of the present invention, the decorative, multi-layer surfacing material is a high pressure laminate.

Other aspects, features and advantages will be apparent from the following disclosure, including the detailed description, preferred embodiments, and the appended claims.

BRIEF DESCRIPTION OF SEVERAL VIEWS OF THE DRAWINGS

The foregoing summary, as well as the following detailed description of preferred embodiments of the invention, will be better understood when read in conjunction with the appended drawings. For purposes of illustration the invention, there are shown in the drawings embodiments which are presently preferred. It should be understood, however, that the invention is not limited to the precise arrangements and instrumentalities shown.

In the drawings:

FIG. 1b is a cross-sectional view of the embodiment shown in FIG. 1a, taken along line A'-A';

FIGS. 2a-2b are cross-sectional views of a multi-layer surfacing material in accordance with an embodiment of the invention before and after compression;

DETAILED DESCRIPTION OF THE INVENTION

Figure 1A:
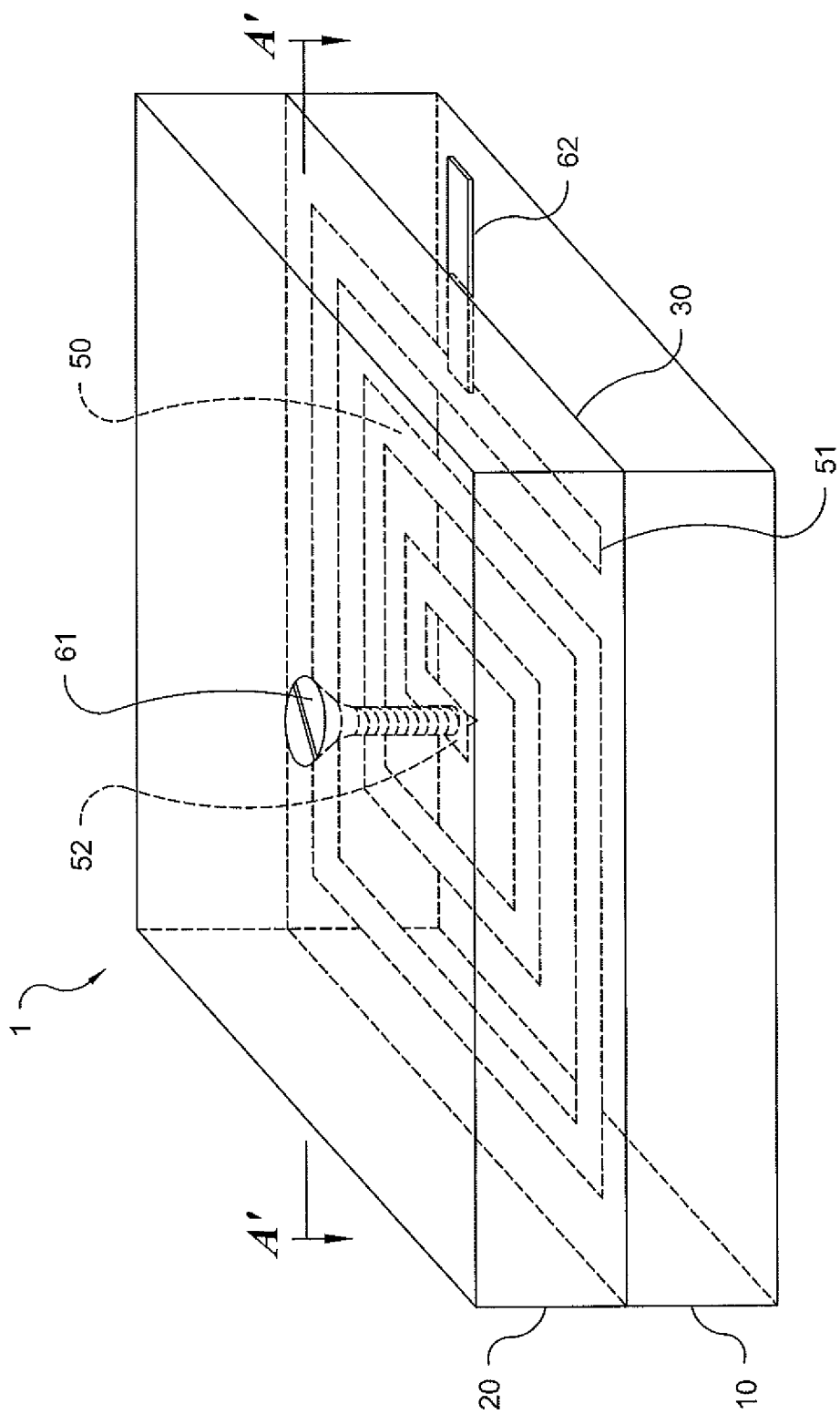
FIG. 1a is a perspective view of a multi-layer surfacing material in accordance with an embodiment of the invention.

As used herein, the singular terms "a" and "the" are synonymous and used interchangeably with "one or more" and "at least one," unless the language and/or context clearly indicates otherwise. Accordingly, for example, reference to "a paper layer" or "the paper layer" herein or in the appended claims can refer to a single paper layer or more than one paper layer. Additionally, all numerical values, unless otherwise specifically noted, are understood to be modified by the word "about."

For simplicity and clarity of illustration, elements in the figures are not necessarily to scale, and the same reference numbers in different figures denote the same elements. For clarity of the drawing, layers and conductive materials may be shown as having generally straight line edges and precise angular corners. However, those skilled in the art understand that the edges need not be straight lines and the corners need not be precise angles.

Certain terminology is used in the following description for convenience only and is not limiting. The words "right", "left", "lower", and "upper" designate directions in the drawing to which reference is made. The words "inwardly" and "outwardly" refer direction toward and away from, respectively, the geometric center of the object described and designated parts thereof. The terminology includes the words above specifically mentioned, derivatives thereof and words of similar import. Additionally, ordinal designations used herein and an it appended claims, such as "first", "second", "third", etc., are solely for the purpose of distinguishing separate, multiple, similar elements (e.g., a first resin-impregnated paper layer and a second resin-impregnated paper layer), and do not import any specific ordering or spatial limitations unless otherwise required by context.

Various embodiments of the present invention are directed to decorative, multi-layer surfacing materials, as well as such materials disposed upon an underlying substrate. Additional various embodiments of the present invention are directed to methods of making such surfacing materials, and other various embodiments are directed to methods including using such surfacing materials to transmit power wirelessly. As used herein, the term "multi-layer" refers to two or more (i.e., at least two) layers. As used herein, the term "decorative" refers to any aesthetic attribute, and includes, but is not limited to, color, design, texture, indicia and the like, which may appear at any portion or portions of the material or across the entire surface of the material. As used herein, the term "surfacing material" refers to an application of various embodiments of the present invention as an upper or outermost surface of, for example, a countertop or table which may comprise a decorative, multi-layer surfacing material in accordance with an embodiment of the invention disposed on a support or a substrate such as, for example, reconstituted wood panels, polymer foamed panels, fiberglass-reinforced plastic (FRP), solid surfacing or polymarble.

Various embodiments of the present invention are directed to decorative, multi-layer surfacing materials, wherein the surfacing materials comprise two or more resin-impregnated paper layers which are preferably laminated together. In various embodiments of the present invention, the surfacing materials include a first resin-impregnated paper layer and a second resin-impregnated paper layer between which a conductive material is disposed. Suitable paper which may be used in resin-impregnated paper layers in accordance with the various embodiments of the present invention, such as the first resin-impregnated paper layer and the second resin-impregnated paper layer, include but are not limited to: cellulose fiber, synthetic woven or non-woven fiber, or/and microfiber or/and nanofiber, mixtures of cellulose or/and synthetic fiber based papers or/and mineral fiber based papers or/and glass fiber based papers, coated or non-coated, pre-impregnated or non pre-impregnated that could be generally used for the production of decorative laminates. In various embodiments of the present invention, paper suitable for use in resin-impregnated paper layers has at least one, and preferably all of the following properties: a minimum wet strength in the machine direction of 1400 cN/30 mm in accordance with the test method of the International Standard DIN ISO 3781, a Klemm absorbency range (capillary rise) in the machine direction of 30 to 90 mm/10 min in accordance with the test method of the International Standard DIN ISO 8787 with a preferred absorbency of 45 mm/10 mm, Ash content 0 to 50% depending of the intrinsic nature of the paper used in accordance with the test method of the International Standard Din ISO 2144, a basis weight range of 10 to 100 g/m2 at moisture content range of 2 to 8% in accordance the test method of the International Standard DIN ISO 536 with a preferred basis weight of 27 g/m2, a pH (on hot extract) of 4 to 9 in accordance with the test method of the International Standard DIN ISO 6588. In various preferred embodiments of the present invention, paper suitable for use in resin-impregnated paper layers comprises 100% cellulose paper meeting all of the afore-mentioned property parameters.

Paper layers suitable for use in various embodiments of the invention are impregnated with a resin. In various embodiments of the present invention, resins suitable for use include thermoset resins. Specific suitable resins for use in the various embodiments of the present invention may differ depending on whether the resin-impregnated paper layer is an outer protective layer, or a core layer. Outer protective layers are discussed further hereinbelow. Generally, resin-impregnated paper layers which are core layers, such as a first resin-impregnated paper layer and a second resin-impregnated paper layer in various embodiments of the present invention are impregnated with any suitable thermoset resin including, but not limited to, polyesters, polyurethanes, phenolics, phenol-formaldehydes, urea-formaldehydes, melamines, diallyl-phthalates, epoxides, polyimides, cyanates, and polycyanurates, or copolymers, terpolymers or combinations thereof. In various preferred embodiments of the present invention, resin-impregnated paper layers which are core layers, such as a first resin-impregnated paper layer and a second resin-impregnated paper layer, are impregnated with a phenolic and/or epoxy resin. In various preferred embodiments of the present invention, resin-impregnated paper layers which are core layers, such as a first resin-impregnated paper layer and a second resin-impregnated paper layer, are impregnated with a phenolic resin, such as, for example, a phenolic-formaldehyde resin.

Paper layers suitable for use in various embodiments of the invention are impregnated with a resin as discussed above. Impregnating paper layers used in accordance with the various embodiments of the present invention with a resin can be carried out in any suitable manner sufficient to apply a controlled quantity of resin to the paper, including but not limited to, screen printing, rotary screen printing, dip and squeeze, dip and scrape, reverse roll-coating, Meyer bar, curtain coating, slot-dye and gravure roller. The percentage of resin applied, as measured on an oven dried basis, is in the range of about 5 to 75%, with a preferred percentage pick-up range of about 25-55%.

The preferred method of impregnating a paper layer in accordance with the various embodiments is a multistage screen printing where each screen printing stage coats and impregnates defined sections of the paper surface according to the mask pattern pre-built into each screen stage.

As the resins used in the impregnating step are normally aqueous or solvent based solutions, it is common in the decorative laminating process to include a paper drying stage to reduce the paper solvent loading. In the various embodiments of the present invention the level of residual solvent is 5-15% with a typical level of 7.5%.

Various embodiments of the present invention include one or more conductive materials (e.g., a first conductive material, a second conductive material, a third conductive material, etc.) disposed on one or more surfaces of one or more resin-impregnated paper layers, or in other words, interposed between two neighboring resin-impregnated paper layers. Conductive materials suitable for use in accordance with the various embodiments of the present invention include any material which can be deposited upon resin-impregnated paper and which is electrically conductive. Suitable conductive materials include metals, alloys, and conductive inks. Metallization can be carried out via deposition of a metal trace on a suitable substrate and transfer to the paper layer in accordance with known transfer methodologies. Preferably, conductive materials for use in the various embodiments of the present invention have a low resistance, are easily deposited in a pattern and maintain their geometric integrity under the heat and pressure conditions of lamination. In various preferred embodiments of the present invention, conductive materials comprises a conductive ink. Conductive inks suitable for use in various preferred embodiments of the invention are compositions which comprise metal, conductive carbon, or other conductive materials such as polymers, in a carrier medium which may include other polymers, solvents and additives, and which may be deposited by various known methodologies such as inkjet printing, screen printing, flexographic or gravure printing, extrusion printing, and three-dimensional printing. Conductive inks are commercially available from a number of sources and can be prepared using a number of known methods. Particularly preferred conductive inks suitable for use in various preferred embodiments of the present invention include silver and/or conductive carbon particles.

Conductive materials disposed on a surface of a layer in the various embodiments of the present invention have at least a first terminus and a second terminus. Conductive materials are preferably disposed in a pattern on a surface of a layer in the various embodiments of the present invention. Suitable patterns for use in accordance with various preferred embodiments of the invention provide at least one terminus that is located at or near the periphery of the layer on which it is disposed, and in various embodiments of the present invention having multiple conductive materials disposed on multiple surfaces, a terminus is provided at an inner position on the surface wherein this terminus can be conductively connected to an inner-positioned terminus of another conductive material disposed on the surface of another layer. Patterns suitable for use in accordance with the various embodiments of the present invention include, but are not limited to: continuous, meandering lines; spirals; spirangles; sawtooth waves; and combinations thereof Preferably, conductive materials in various embodiments of the present invention are disposed in patterns which provide the longest linear amount of conductive material on the surface while maintaining a non-conductive distance between adjacent portions of the conductive pathway. Thus, for example, in certain preferred embodiments of the present invention, a conductive material is disposed on a rectangular surface in a corresponding rectangular spirangle beginning with a first terminus located at an outer edge (i.e., periphery) of the surface and continuing in a rectangular spirangle shape towards a central location of the rectangular surface to a second terminus. The cross-sectional area of any linear portion of a conductive material is important in circumstances where electrical resistance is to be minimized as the total electrical resistance of any conductive track is the product of the specific resistance per square (related to cross-sectional area) and the track length. In other words, as understood by those skilled in the art, higher overall track resistances lead to higher resistive heating for similar electric current levels. Accordingly, it is preferable, in the circuit design in the various embodiments of the invention, to optimize the relationship between track vertical thickness, the cross sectional area and the pitch (i.e., the distance between two adjacent linear portions of the conductive material on a surface) which should be controlled to be as small as possible while ensuring that the two adjacent linear portions do not touch. It is also important to note that the pressure involved in the compression stage in the various embodiments of the invention reduces the vertical thickness of the conductive track. The overall effect on total electrical resistance may vary as the compression may increase specific resistance of the conductive ink by decreasing the cross-sectional area, while also increasing conductive contact between conductive particles within the track materials, thus decreasing resistance. Thus, various factors affect overall resistance. Preferably all such factors are considered in efforts to reduce overall resistance, and thus, heat generation.

Multi-layer surfacing materials in accordance with the various embodiments of the present invention may include one or more conductive protrusions which provide an electrical connection between a terminus of a conductive material and the exterior of the surfacing material. In various embodiments wherein the surfacing material includes multiple conductive materials connected in series, as described herein, the surfacing material may include a conductive protrusion providing an electrical connection between a first terminus of the first conductive material in the series and the exterior of the surfacing material, and a second conductive protrusion providing an electrical connection between the second terminus of the last conductive material in the series and the exterior of the surfacing material. In the various embodiments of the present invention, the surfacing material may further include a component or components connected to the ends of the conductive protrusion on the exterior of the surfacing material which component(s) are configured to accept AC, or pulsed DC, voltage input from an external source such that the conductive material(s) are provided with a current. Such components may include, but are not limited to various female receptacles for AC and DC plugs, and terminal boxes or the like for hard-wiring AC or DC inputs. Conductive protrusions suitable for use in the various embodiments of the present invention may be comprised of any conductive material and include but are not limited to metal tabs, screws, prongs, cylindrical receptacles, etc.

Referring to FIG. 1a, a decorative, multi-layer surfacing material 1 in accordance with one embodiment of the invention is shown. A first resin-impregnated paper layer 10 has a first conductive material 50 disposed on a first surface thereof in a rectangular spirangle pattern. The first conductive material 50 has a first terminus 51 located near the periphery of the surfacing material 1, and a second terminus 52 in a central location of the surface. A second resin-impregnated paper layer 20 is disposed in a stacked relationship with the first resin-impregnated paper layer 10, such that their facing surfaces meet at interface 30. Conductive protrusion 61, in the form of a metal screw, is disposed at a central location and provides an electrical connection point between second terminus 52 and the exterior of the material 1. Conductive protrusions, such as conductive protrusion 61 in the form of a metal screw or otherwise, may be countersunk to any depth below an exterior surface, so long as conductive connection with a conductive material terminus is maintained. Conductive protrusion 62, in the form of a metal tab, is disposed along the periphery and provides an electrical connection point between first terminus 51 and the exterior of the material 1.

Referring to FIG. 1b, a cross-sectional view of the decorative, multi-layer surfacing material 1 along the line A'-A' in FIG. 1a is shown. First conductive material 50, disposed in a rectangular spirangle, is disposed on a surface of the first resin-impreganted paper layer 10. Second resin-impregnated paper layer 20 is disposed in a stacked, compressed and cured relationship with the first resin-impregnated layer 10, such that the first conductive material 50 is encapsulated between the resin-impregnated layers 10, 20, at their interface 30. Conductive protrusions 61, 62 provide electrical contact points for supplying a current to the first conductive material 50.

In the various embodiments of the present invention, additional layers of resin-impregnated paper and additional conductive materials, preferably patterned, may be included. For example, in various embodiments of the present invention, in addition to a first conductive material disposed between a first and second resin-impregnated layers, a second conductive material may be disposed on a second surface of the first resin-impregnated paper layer, and a third resin-impregnated paper layer may then be disposed in a stacked relationship with the first paper layer, such that the second conductive material is encapsulated by the first and third paper layers. The second and any additional conductive materials may also be patterned, preferably in the same pattern as the first conductive material, and may also have a conductive protrusion conductively connected to either or both the first terminus and/or second terminus of the second and each of any additional conductive materials. Moreover, in various embodiments of the present invention, the first and second conductive materials may be conductively connected through the intervening paper layer. Additionally, in various embodiments comprising further paper layers and additional conductive materials, successive conductive materials may be conductively connected through the intervening paper layer to the conductive material on either or both sides. Conductive connection of two conductive materials through the intervening paper layer may be accomplished via any provision of electrical connection, and can preferably be accomplished by providing an aperture in the intervening paper layer, wherein the aperture is positioned such that the conductive materials on the opposing sides of the paper layer make a physical and electrical connection when the layers are compressed together, or can be provided by a masking and ink saturation technique described herein. Apertures may be suitably provided by the use of a mechanical punch that physically removes a section of paper.

Referring to FIG. 2a, a cross-sectional view of a surfacing material 201 according to an embodiment of the present invention is shown. A first conductive material 250 is disposed in a pattern on a first resin-impregnated paper layer 210. A second resin-impregnated paper layer 220 is disposed in a stacked relationship with the first resin-impregnated paper layer 210. The second resin-impregnated paper layer 220 is provided with an aperture 270 located in alignment with a portion of the first conductive material 250. A third resin-impregnated layer 240 is disposed in a stacked relationship with the first and second resin-impregnated paper layers 210, 220. A second conductive material 251 is disposed, in a pattern corresponding to the pattern of the first conductive material 250, between the second and third resin-impregnated layers, and such that a portion of the second conductive material 251 is in alignment with aperture 270. Referring to FIG. 2b, upon compression of the surfacing material 201, the first and second conductive materials form a physical and electrical connection 280 through the aperture. The first and second conductive materials 250, 251 remain electrically separated 290 at all other points where there is no aperture.

In various embodiments of the present invention, a conductive connection between conductive materials on opposing sides of a paper layer can be provided by applying a mask (e.g., a blocking pattern) at the location on the paper where the conductive connection is to be located on both sides of the paper layer, prior to resin-impregnation. The mask prevents the impregnation of the paper with the resin at the site of the mask. Subsequent to resin-impregnation, the mask is removed, and upon deposition of a conductive ink or other conductive material capable of permeating the paper layer, a conductive connection through the paper layer is thus provided. In various embodiments of the present invention, a conductive connection between conductive materials on opposing sides of a paper layer can be provided by a multi-stepped screen printing process where a specific area designated for through paper electrical connection (380, 316, 580, 581) is printed with conductive ink in successive applications in vertical alignment on opposing sides of the paper such that the conductive ink penetrates through the entirety of the thickness creating a conductive pathway electrically. The mask or blocking pattern can be pre-built into the screen using common photolithographical techniques known by those skilled in the art of printing screen production.

Figure 3A:
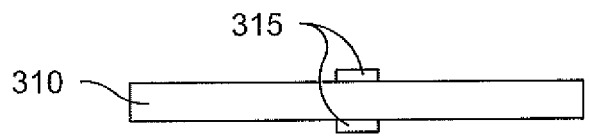
FIGS. 3a-3c are cross-sectional views of a resin-impregnated paper layer of a multi-layer surfacing material in accordance with an embodiment of the invention.
Figure 3B:
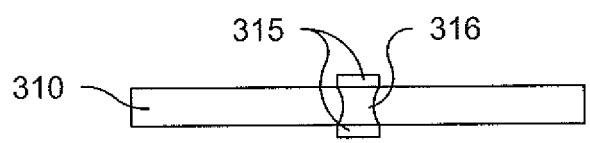
Figure 3C:
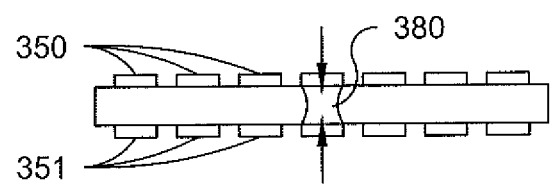

Referring to FIGS. 3a through 3b, a cross-sectional view of the preparation of a conductive connection through a paper layer in accordance with an embodiment of the present invention is shown. Referring to FIG. 3a, a paper layer 310 is provided and mask 315 is provided on both sides of paper layer 310 at the location of the desired conductive connection. Referring to FIG. 3b, the paper layer 310 is then impregnated with a resin. The portion 316 of the paper layer protected by the mask 315 does not become impregnated with the resin. Referring to FIG. 3c, subsequent to removal of the mask, conductive materials 350, 351 comprising a conductive ink are deposited on the opposing sides of the paper layer in a pattern, of which a portion covers the portion 316 not impregnated with the resin, such that the conductive ink saturates the paper forming conductive connection 380 between the first conductive material 350 and the second conductive material 351.

Figure 4:
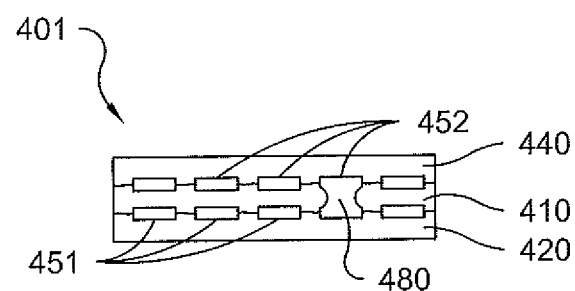
FIG. 4 is a cross-sectional view of a multi-layer surfacing material in accordance with an embodiment of the invention.

Referring to FIG. 4, a cross-sectional view of a surfacing material 401 in accordance with an embodiment of the present invention is shown in which a first resin-impregnated paper layer 410 (such as shown in FIG. 3c) having a first conductive material 451 and a second conductive material 452 conductively connected by a conductive ink saturated portion 480 of the first resin-impregnated paper layer 410, is disposed in a stacked relationship between a second resin-impregnated paper layer 420 and a third resin-impregnated paper layer 440.

Figure 5A:
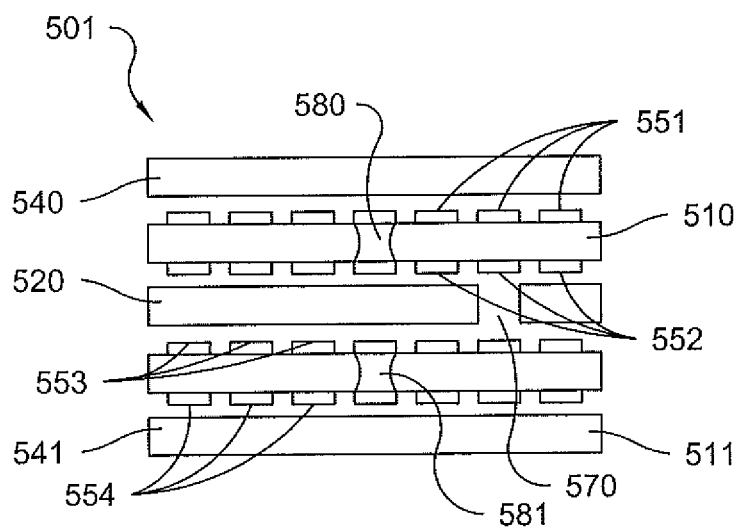
FIGS. 5a-5b are cross-sectional views of a multi-layer surfacing material in accordance with an embodiment of the invention before and after compression.
Figure 5B:
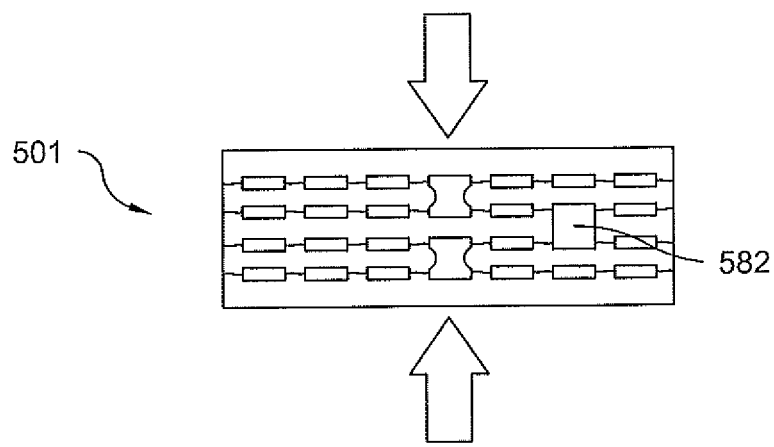

Referring to FIGS. 5a and 5b, a cross-sectional view of a surfacing material 401 in accordance with an embodiment of the present invention is shown wherein conductive connections of conductive materials by a masking technique as described herein and by an aperture are combined. As shown in FIG. 5a, a first resin-impregnated paper layer 510 (such as shown in FIG. 3c) having a first conductive material 551 and a second conductive material 552 conductively connected by a conductive ink saturated portion 580 of the first resin-impregnated paper layer 510, is disposed in a stacked relationship with a second resin-impregnated paper layer 511 having a third conductive material 553 and a second conductive material 554 conductively connected by a conductive ink saturated portion 581 of the second resin-impregnated paper layer 511, with a third resin-impregnated paper layer 520 interposed between the first and second resin-impregnated paper layers 510, 511. The third resin-impregnated paper layer 520 can have an aperture 570 positioned to be aligned with portions of the second and third conductive materials 552, 553. A fourth resin-impregnated paper layer 540 and a fifth resin-impregnated paper layer 541 are disposed in a stacked relationship adjacent to the first and fourth conductive materials 551, 554, respectively. Referring to FIG. 5b, the stacked layers shown in FIG. 5a are compressed, preferably with heat and pressure as indicated in the figure by the large block arrows, such that the second conductive material 52 and the third conductive material 553 form a physical electrical connection 582 in the location of aperture 570.

The decorative multi-layer surfacing materials in accordance with the various embodiments of the present invention include at least two resin-impregnated paper layers with a conductive material disposed between the outer layers, wherein at least one layer is a decorative layer as described herein below. The various embodiments of the present invention include at least one conductive material, preferably 2 to 20 conductive materials, more preferably 6 to 14 conductive materials, and in various preferred embodiments, 6, 7, 8, 9, 10, 11, 12, 13 or 14 conductive materials can be present.

In the various embodiments of the present invention having more than one conductive material, two or more conductive materials or all conductive materials may be conductively connected in series, and a single embodiment may include conductive connection made by multiple methods, such as both an intervening layer with an aperture and/or layers having conductive ink saturated portions connecting conductive materials on opposing surfaces of the paper layer.

Decorative, multi-layer surfacing materials in accordance with the various embodiments of the present invention can further include one or more enhancement layers. Enhancement layers which may be included in the various embodiments of the present invention comprise a soft magnetic material dispersed in a resin which is preferably a thermoset resin. Various thermoset resins suitable for use in impregnating the paper layers used in the present invention may suitably be used for dispersion of a soft magnetic material and formation of an enhancement layer. In various embodiments of the present invention, an enhancement layer can be disposed between a conductive material and an adjacent resin-impregnated paper layer. Additionally or alternatively, an enhancement layer can be incorporated as an interposing separating layer between two conductive materials. Accordingly, for example, in various embodiments of the present invention, a resin-impregnated paper layer having a conductive material disposed on a surface thereof can be disposed in a stacked relationship with another, second resin-impregnated paper layer having a second conductive material disposed on the surface thereof facing the first conductive material, wherein an enhancement layer is interposed between the first and second conductive materials. Additionally, in such embodiments, the enhancement layer may be provided with an aperture to provide a conductive connection between the first and second conductive materials. In various preferred embodiments of the present invention, a decorative multi-layer surfacing material can comprise multiple resin-impregnated paper layers prepared as shown in FIG. 3a-3c, in a stacked relationship with an enhancement layer interposed between the adjacent conductive materials, for example, where either of both of second resin-impregnated paper layer 420 and third resin-impregnated paper layer 440, shown in FIG. 4, is replaced by or further includes an enhancement layer. In such preferred embodiments, the enhancement layers may further include apertures to provide for conductive connections between adjacent conductive materials. Various embodiments of the present invention may further include combinations of conductive connections and enhancement layers in place of or in addition to resin-impregnated paper layers. For example, various embodiments of the present invention include multi-layer surfacing materials as depicted in FIGS. 5a-5b wherein one or more of the second, third and/or fourth resin-impregnated paper layers 520, 540, 541 is replaced by, or further includes, an enhancement layer. In certain particularly preferred embodiments of the present invention, three to six resin-impregnated paper layers prepared as shown in FIG. 3a-3c, are provided in a stacked relationship with an enhancement layer interposed between each of the adjacent conductive materials with an aperture in each enhancement layer such that the 6 to 12 conductive materials are conductively connected in series.

Enhancement layers suitable for use in accordance with various embodiments of the present invention include a soft magnetic material dispersed in a resin. Soft magnetic materials suitable for use include, but are not limited to, soft ferrites. Ferrites are ceramic compounds of the transition metals with oxygen, which are ferrimagnetic but nonconductive. Suitable soft ferrites include those containing nickel, zinc, and/or manganese compounds. Suitable soft magnetic materials, including soft ferrites, have a low coercivity, meaning the material's magnetization can easily reverse direction without dissipating much energy (hysteresis loss), while the material's high resistivity prevents eddy currents, another source of energy loss. Preferred soft ferrites include manganese-zinc ferrite (MnZn, with the formula $Mn_aZn_{(-a)}Fe2O4$) and nickel-zinc ferrite (NiZn, with the formula $Ni_aZn(1_{-a})Fe2O4$).

Enhancement layers in accordance with the various embodiments of the present invention described herein can be provided by any suitable method of deposition including coating, spraying, rolling and the like.

Multi-layer surfacing materials in accordance with the various embodiments of the present invention include at least one decorative layer. The at least one decorative layer may be the first resin-impregnated paper layer, the second resin-impregnated layer, any other resin-impregnated layer described herein, or an additional layer providing an aesthetic attributes. Decorative layers include an aesthetic attribute and are known in various decorative surfacing materials which are commercially available. Decorative layers may comprise a resin-impregnated paper layer wherein the paper layer further comprising a pattern, coloring, texture, embedded objects or other attributes which are visible from the exterior of the multi-layer surfacing material. Decorative layers may also include polymeric layers or other materials which include a pattern or coloring or other aesthetic attributes. In various preferred embodiments of the present invention, the multi-layer surfacing material includes a decorative layer selected from the group consisting of colored paper, patterned paper and combinations thereof. Preferably, a decorative layer is disposed near the exterior surface of the multi-layer surfacing material to maximize the visual effect of the aesthetic attribute.

Decorative, multi-layer surfacing materials in accordance with various embodiments of the present invention may further include a protective outer layer. Protective outer layers are preferred where the surfacing material is required or desired to have durability and/or resistance to damage which may be caused by, for example, scratching. Any outer protective layer known for use in decorative surfacing materials, such as laminates may be used in the various embodiments of the present invention. In various preferred embodiments of the present invention, an outer protective layer comprises a thermosetting melamine resin, but could also be a UV or electron beam cured member of the acrylate family (e.g., epoxy acrylate, urethane, melamine acrylate). Additional protection can be provided by incorporation of an abrasive (e.g., alumina) into the resin at a level of 0.5 to 5% and particle size of 1 micron to 100 micron.

Decorative, multi-layer surfacing materials in accordance with various embodiments of the present invention may further include circuit components embedded within the material in conductive connection with the one or more conductive materials disposed therein. For examples, various resistors, inductors, capacitors, diodes, higher-order components and combinations thereof may be included on the surface of a resin-impregnated paper layer in the circuit created by the one or more conductor materials. Accordingly, various embodiments of the present invention may include functional circuits which may control one or more electronic elements embedded or connected to the surfacing materials, including, for example, light-emitting diodes, electroluminescent materials or switches, etc.

Various embodiments of the present invention are directed to solid surfaces which comprises a surfacing material in accordance with any of the foregoing embodiments, disposed on an underlying substrate. Underlying substrate suitable for use include, but are not limited to plywood, fiberboard and the like. A surfacing material in accordance with the various embodiments of the invention may be adhered to the underlying substrate with any suitable adhesive, such as a wood glue or epoxy. Solid surfaces in accordance with various embodiments of the present invention may be dimensioned and shaped to be used for various building and furniture applications, including, for example, table tops, countertops, desk tops, partitions, etc.

In various embodiments of the present invention, a solid surface may further comprise one or more components which are connected to the conductive material embedded in the surfacing material, preferably via one or more conductive protrusions, and which one or more components are configured to accept AC voltage input from an external source such that the conductive material(s) are provided with a current, as previously described. In various preferred embodiments, the one or more components are configured within the underlying substrate such that they do not protrude from the substrate, i.e., such that all surfaces are flush.

Various embodiments of the present invention are directed to methods of making surfacing materials, and solid surfaces, in accordance with the previously described embodiments thereof. Methods of making surfacing materials in accordance with various embodiments of the present invention include providing two or more resin-impregnated paper layers, with at least one conductive material disposed between the paper layers, and compressing the layers with heat and pressure. The combination of layers provided in a stacked relationship to be compressed with heat and pressure can be in accordance with any of the aforementioned embodiments, with conductive connections between multiple conductive materials provided in any of the manners described herein above.

In various preferred embodiments of methods of making surfacing materials in accordance with the present invention, a high pressure lamination process is employed. In accordance with such various preferred embodiments, the multiple layers according to any of the previously described embodiments are positioned in a stacked relationship between two pressing plates. The plates are then pressed to a specific pressure of at least 1000 psi. The temperature can then be raised to <140° C. The plates are then held at the elevated pressure and temperature for a period of time suitable for curing the resin. The temperature is then lowered to <40° C., while maintaining the elevated temperature. Upon achieving a temperature of <40° C., the pressure on the plates is then reduced to zero gauge pressure.

While it is important to take care in ensuring that the stacked layers are aligned where a conductive connection between adjacent conductive materials through an aperture in an intervening layer is to be provided, the layers need not otherwise be placed in perfect edge to edge alignment, as a post-pressing trimming may be carried out to shape the final surfacing material.

Various other embodiments of the present invention are directed to methods of wireless transmission of energy using surfacing materials in accordance with any of the other embodiments described herein. Methods of wirelessly transmitting energy in accordance with the present invention include providing a decorative, multi-layer surfacing material or solid surface in accordance with any of the previously described embodiments, providing electrical current to the conductive material embedded within the surfacing material such that an electromagnetic field is generated in a region adjacent to an upper (i.e., outer) surface of the surfacing material, and placing a device configured to receive wireless energy transmission proximate to the upper surface of the surfacing material and within the electromagnetic field. Devices configured to receive such energy transmission include any portable electronic device provided with an internal inductor suitable for magnetic resonance inductive coupling. Such devices are known and available commercially.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A decorative, multi-layer surfacing material comprising: a first resin-impregnated paper layer and a second resin-impregnated paper layer, an enhancement layer comprising a soft magnetic material dispersed in a thermoset resin, and a first conductive material having a first terminus and a second terminus and capable of carrying an electric current from the first terminus to the second terminus; wherein the first resin-impregnated paper layer and the second resin-impregnated paper layer are disposed in a stacked and compressed relationship such that the first conductive material is encapsulated between the first resin-impregnated paper layer and the second resin-impregnated paper layer; wherein the enhancement layer is disposed and cured between the first conductive material and one of the first and second resin impregnated layers; and wherein at least one of the first resin-impregnated paper layer, the second resin-impregnated paper layer or an optional additional resin-impregnated paper layer is a decorative layer.

2. The decorative, multi-layer surfacing material according to claim 1, further comprising at least one outer protective layer.

3. The decorative, multi-layer surfacing material according to claim 2, wherein the at least one outer protective layer comprises a polymer selected from the group consisting of acrylics, polyesters, melamine resins, vinyl resins, and urethanes.

4. The decorative, multi-layer surfacing material according to claim 2, wherein the at least one outer protective layer comprises a melamine resin.

5. The decorative, multi-layer surfacing material according to claim 1, wherein the decorative layer comprises a visual attribute selected from the group consisting of colorings, patterns, indicia, pictures, embedded objects, and combinations thereof.

6. The decorative, multi-layer surfacing material according to claim 1, wherein the first conductive material disposed on the first surface of the first resin-impregnated paper layer is patterned.

7. The decorative, multi-layer surfacing material according to claim 6, wherein the patterned first conductive material comprises a continuous meandering line selected from the group consisting of spirals, spirangles, sawtooth waves and combinations thereof.

8. A decorative, multi-layer surfacing material according to claim 1, further comprising a third resin-impregnated paper layer and a second conductive material having a first terminus and a second terminus and capable of carrying an electric current from the first terminus to the second terminus, wherein the second conductive material is disposed on a second surface of the of the first resin-impregnated paper layer, wherein the second surface is on a side of the first resin-impregnated paper layer opposite of the first surface, and wherein the first resin-impregnated paper layer and the third resin-impregnated paper layer are disposed in a stacked and compressed relationship such that the second conductive material is encapsulated between the first resin-impregnated paper layer and the third resin-impregnated paper layer.

9. The decorative, multi-layer surfacing material according to claim 1, wherein the first conductive material and the second conductive material are conductively connected through the first resin-impregnated paper layer.

10. The decorative, multi-layer surfacing material according to claim 9, further comprising a third conductive material having a first terminus and a second terminus and capable of carrying an electric current, wherein the third conductive material is disposed on a first surface of the second resin-impregnated paper layer, wherein the third conductive material is in a facing relationship with the first conductive material, wherein the resin impregnating the first and second paper layers comprises a thermoset resin, and wherein an additional layer selected from the group consisting of an interposed resin-impregnated paper layer, an enhancement layer comprising a soft magnetic material dispersed in a thermoset resin, and combinations thereof, is disposed and cured between the first conductive material and the third conductive material.

11. The decorative, multi-layer surfacing material according to claim 10, wherein the first conductive material and the third conductive material are conductively connected through the additional layer.

12. The decorative, multi-layer surfacing material according to claim 1, further comprising a first conductive protrusion and a second conductive protrusion extending from the first terminus and second terminus of the first conductive material, respectively, to two positions along a periphery of the surfacing material and configured such that an external electrical current can be supplied to the conductive protrusion.

13. The decorative, multi-layer surfacing material according to claim 1, further comprising a circuit component disposed on the first surface of the first resin-impregnated paper layer and in conductive contact with the first conductive material.

14. The decorative, multi-layer surfacing material according to claim 1, wherein the material is a high pressure laminate.

15. A solid surface comprising the decorative, multi-layer surfacing material according to claim 1 disposed on a supporting substrate.

16. A decorative, multi-layer surfacing material comprising: a first resin-impregnated paper layer and a second resin-impregnated paper layer, and a first conductive material having a first terminus and a second terminus and capable of carrying an electric current from the first terminus to the second terminus; wherein the first conductive material comprises a conductive ink; wherein the first conductive material is disposed on a first surface of the first resin-impregnated paper layer; wherein the first resin-impregnated paper layer and the second resin-impregnated paper layer are disposed in a stacked and compressed relationship such that the first conductive material is encapsulated between the first resin-impregnated paper layer and the second resin-impregnated paper layer, further comprising a third resin-impregnated paper layer and a second conductive material having a first terminus and a second terminus and capable of carrying an electric current from the first terminus to the second terminus; wherein the second conductive material is disposed on a second surface of the first resin-impregnated paper layer; wherein the second surface is on a side of the first resin-impregnated paper layer opposite of the first surface; wherein the first resin-impregnated paper layer and the third resin-impregnated paper layer are disposed in a stacked and compressed relationship such that the second conductive material is encapsulated between the first resin-impregnated paper layer and the third resin-impregnated paper layer; and wherein at least one of the first resin-impregnated paper layer, the third resin-impregnated paper layer or an optional additional resin-impregnated paper layer is a decorative layer.

17. The decorative, multi-layer surfacing material according to claim 16, further comprising at least one outer protective layer.

18. The decorative, multi-layer surfacing material according to claim 17, wherein the at least one outer protective layer comprises a polymer selected from the group consisting of acrylics, polyesters, melamine resins, vinyl resins, and urethanes.

19. The decorative, multi-layer surfacing material according to claim 17, wherein the at least one outer protective layer comprises a melamine resin.

20. The decorative, multi-layer surfacing material according to claim 16, wherein the decorative layer comprises a visual attribute selected from the group consisting of colorings, patterns, indicia, pictures, embedded objects, and combinations thereof.

21. The decorative, multi-layer surfacing material according to claim 16, wherein the first conductive material disposed on the first surface of the first resin-impregnated paper layer is patterned.

22. The decorative, multi-layer surfacing material according to claim 21, wherein the patterned first conductive material comprises a continuous meandering line selected from the group consisting of spirals, spirangles, sawtooth waves and combinations thereof.

23. The decorative, multi-layer surfacing material according to claim 16, wherein the first conductive material and the second conductive material are conductively connected through the first resin-impregnated paper layer.

24. The decorative, multi-layer surfacing material according to claim 16, further comprising an enhancement layer comprising a soft magnetic material dispersed in a thermoset resin, the enhancement layer disposed and cured between one of the first and second conductive materials and an adjacent resin impregnated layer.

25. The decorative, multi-layer surfacing material according to claim 23, further comprising a third conductive material having a first terminus and a second terminus and capable of carrying an electric current, wherein the third conductive material is disposed on a first surface of the second resin-impregnated paper layer, wherein the third conductive material is in a facing relationship with the first conductive material, wherein the resin impregnating the first and second paper layers comprises a thermoset resin, and wherein an additional layer selected from the group consisting of an interposed resin-impregnated paper layer, an enhancement layer comprising a soft magnetic material dispersed in a thermoset resin, and combinations thereof, is disposed and cured between the first conductive material and the third conductive material.

26. The decorative, multi-layer surfacing material according to claim 25, wherein the first conductive material and the third conductive material are conductively connected through the additional layer.

27. The decorative, multi-layer surfacing material according to claim 16, further comprising a first conductive protrusion and a second conductive protrusion extending from the first terminus and second terminus of the first conductive material, respectively, to two positions along a periphery of the surfacing material and configured such that an external electrical current can be supplied to the conductive protrusion.

28. The decorative, multi-layer surfacing material according to claim 16, further comprising a circuit component disposed on the first surface of the first resin-impregnated paper layer and in conductive contact with the first conductive material.

29. The decorative, multi-layer surfacing material according to claim 16, wherein the material is a high pressure laminate.

30. A solid surface comprising the decorative, multi-layer surfacing material according to claim 16 disposed on a supporting substrate.

* * * * *